(12) United States Patent
Singh

(10) Patent No.: US 11,722,500 B2
(45) Date of Patent: Aug. 8, 2023

(54) SECURE IDENTITY VERIFICATION MARKETPLACE USING HASHED DATA AND FORWARD HASHING SEARCH FUNCTIONS

(71) Applicant: PAYPAL, INC., San Jose, CA (US)

(72) Inventor: Anurag Singh, Singapore (SG)

(73) Assignee: PAYPAL, INC., San Jose, CA (US)

( * ) Notice: Subject to any disclaimer, the term of this patent is extended or adjusted under 35 U.S.C. 154(b) by 566 days.

(21) Appl. No.: 16/837,947

(22) Filed: Apr. 1, 2020

(65) Prior Publication Data

US 2021/0314331 A1 Oct. 7, 2021

(51) Int. Cl.
*H04L 9/40* (2022.01)
*G06F 16/953* (2019.01)
*G06F 21/62* (2013.01)
*H04L 9/06* (2006.01)

(52) U.S. Cl.
CPC .......... *H04L 63/126* (2013.01); *G06F 16/953* (2019.01); *G06F 21/6227* (2013.01); *H04L 9/0643* (2013.01)

(58) Field of Classification Search
CPC ................. H04L 63/126; H04L 9/0643; H04L 9/0891; H04L 2209/56; H04L 9/3236; G06F 16/953; G06F 21/6227; G06F 21/6245
See application file for complete search history.

(56) References Cited

U.S. PATENT DOCUMENTS

| | | | |
|---|---|---|---|
| 8,843,997 B1* | 9/2014 | Hare | H04L 63/0815 709/200 |
| 11,410,230 B1* | 8/2022 | Olson | G06F 21/6245 |
| 2007/0143227 A1 | 6/2007 | Kranzley et al. | |
| 2009/0282026 A1 | 11/2009 | Nash | |
| 2013/0204879 A1* | 8/2013 | Zeng | G06F 16/22 707/747 |
| 2013/0275365 A1* | 10/2013 | Wang | G06F 16/283 707/E17.014 |
| 2016/0308852 A1 | 10/2016 | Coxe et al. | |

(Continued)

OTHER PUBLICATIONS

Edd Dumbill,"Data Markets Compared", pp. 1-7, http://radar.oreilly.com/2012/03/data-markets-survey.html, Mar. 7, 2012.

(Continued)

*Primary Examiner* — Mohammed Waliullah
(74) *Attorney, Agent, or Firm* — Haynes and Boone, LLP

(57) ABSTRACT

There are provided systems and methods for a secure identity verification marketplace using hashed data and forward hashing search functions. A service provider, such as an electronic transaction processor or other entity that may provide an online platform, may provide an online marketplace accessible by identity verification data bureaus, as well as entities requiring identity verification or other entities. The bureaus may utilize an SDK provided by the service provider to has their identity data and upload to the marketplace with metadata explaining the underlying identity verification data. This may be done so the underlying data is not revealed to the service provider or other entities without purchase and/or request to the bureau. When an entity searches for the data, a forward hashing function may determine hashes of different variations of the search query, which may be used to locate matching data.

20 Claims, 5 Drawing Sheets

(56) References Cited

U.S. PATENT DOCUMENTS

| | | | |
|---|---|---|---|
| 2019/0182042 A1 | 6/2019 | Ebrahimi et al. | |
| 2020/0153606 A1* | 5/2020 | Li | H04L 9/30 |
| 2020/0204557 A1* | 6/2020 | Singh | H04L 9/3239 |
| 2021/0359836 A1* | 11/2021 | Wright | H04L 9/0643 |
| 2021/0383377 A1* | 12/2021 | Zhou | H04L 9/3213 |

OTHER PUBLICATIONS

Banerjee et al., "Blockchain Enabled Data Marketplace-Design and Challenges", pp. 1-9, arXiv:1811.11462 [cs.CR], Apr. 17, 2019.

Ayoade et al., "Decentralized IoT Data Management Using BlockChain and Trusted Execution Environments", pp. 1-8, 2018 IEEE International Conference on Information Reuse and Integration (IRI), Aug. 6, 2018.

Grintsvayg et al. "LBRY: a Blockchain-Based Decentralized Digital Content Marketplace", 2020 IEEE International Conference on Decentralized Applications and Infrastructures (DAPPS). Retrieved on Aug. 7, 2021. Retrieved from <URL: https://ieeexplore.ieee.org/abstract/document/9126007>.

* cited by examiner

SECURE IDENTITY VERIFICATION MARKETPLACE USING HASHED DATA AND FORWARD HASHING SEARCH FUNCTIONS

TECHNICAL FIELD

The present application generally relates to securing and providing verified identity data from multiple different bureaus on a marketplace platform to end customers (e.g., consumers and merchants) and more particularly to a marketplace that allows for hashing of identity verification data in a manner that enables the data to be discovered by any client of the marketplace platform without the bureaus revealing the underlying data during the search and discovery.

BACKGROUND

Service providers and merchants may require identity verification of other users and/or businesses for various requirements. Regulations may require that the identity of a person, business, or other entity be established in order for that entity to avail itself of the service provider's products or services. For example, a service provider may provide account services, including payment account services that allow entities to send and receive payments or otherwise conduct electronic transaction processing with other entities. To utilize these services and products, as well as reduce risk, the service provider may therefore require identity verification of the entity. However, a purchase of this data may be required from an identity verification data bureau.

Currently there are many different bureaus that provide data verification services, such as identity data bureaus that store, provide, and sell identity verification data, as well as confirm the data and continue to update the data. However, it may be difficult for service providers to properly select the correct bureaus as different bureaus may be stronger in certain areas or regions. Moreover, integrations, such as application programming interface (API) integrations, may be required with each bureau when requesting identity verification data, which is difficult with limited or new bureaus when performing data integrations. Thus, service providers may not be able to properly select bureaus and/or retrieve up-to-date data necessary for identity verification.

Figure 1:
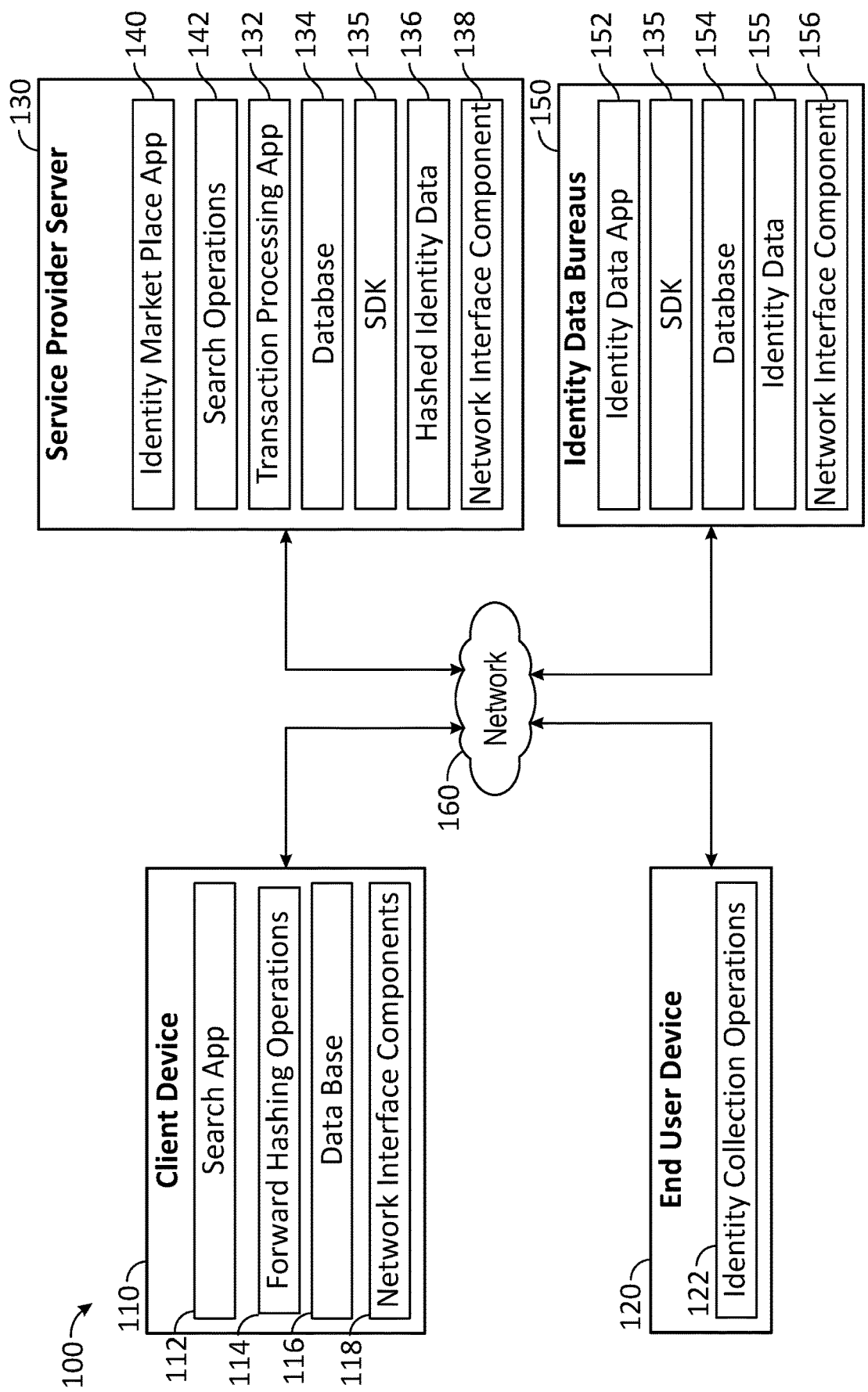
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a secure identity verification marketplace using hashed data and forward hashing search functions. Systems suitable for practicing methods of the present disclosure are also provided.

A service provider, online digital marketplace provider, or other entity may provide a digital marketplace platform where identity verification (IV) data services may be provided by multiple different IV bureaus (e.g., those bureaus or entities selling or providing identity data and verification services of users, businesses, companies, etc.). This may further be provided in a secure manner where the IV data is not revealed to the marketplace platform (e.g., provided to or stored by servers and databases of the marketplace platform) and/or retrievable through the marketplace platform by searching parties in plain text or readable format. In order to do this, the marketplace platform may onboard different IV bureaus that sell or provide the IV data to users, businesses, or other entities requiring identity verification of other entities. When onboarding the IV bureaus, the marketplace platform may provide a software development kit (SDK), or other code snippet or operations, to the IV bureaus, where the SDK may allow for transmitting IV data in a secure manner to the marketplace platform.

For example, an IV bureau may upload data to the marketplace so that users, businesses, or other entities may search, purchase, and/or retrieve the IV data and perform an identity verification of another user, business, or other entity. The IV bureau may previously download and install the SDK from the marketplace platform. Once installed and integrated to the IV bureau's systems, the SDK may allow for the IV data to be hashed utilizing a hashing algorithm and operation that causes the IV data to appear as random characters that obscures the underlying data. This causes the underlying data to be unobtainable even after reverse engineering or decoding without significant time and resources. For example, the hashing operation may allow for conversion, scrambling, and/or mapping of the input IV data into fixed output values (e.g., a bit string or fixed length of characters), wherein inversion of the output values is practically infeasible. Additionally, the hashing operation may utilize an algorithm having output values of sufficient size so as to avoid collision where two different inputs may result in the same output. Hashing the IV data may include hashing an entire IV record (e.g., all the IV data for a particular entity) or hashing a few basic attributes of the entity, such as a name, date of birth, unique identifier of a person (e.g., social security number), business registration date and/or number, etc. The bureau may upload this hashed data to the marketplace platform, which may be provided with metadata identifying the underlying IV data, the last updated and/or verified date of the IV data, a link to retrieve or purchase the data, and any pricing information regarding the data.

Thus, by hashing the data, the service provider for the marketplace platform does not store unhashed or plain data, which may be less secure (e.g., the data may be obtained through security breaches on additional systems) and does not provide payments for the data to the IV bureau. Once uploaded, the hashed IV data having associated metadata may be searchable. In order to provide searching (e.g., as the IV data is hashed), the marketplace platform may provide a search function that utilizes forward hashing. Forward hashing may correspond to operations where a search query is converted to multiple different hashes that are then utilized by the search function to search one or more databases. In order to convert the text of the search query to different hashes, characters, words, or other data within the text may be arranged differently. For example, a first name and last name combination of "Alice Smith," may be arranged as Alice, Smith or Smith, Alice, both of which may be hashed. Other changes may include abbreviations or changes to word representation (e.g., nicknames, abbreviations, different tenses, suffixes, or prefixes, etc.), such as Street or St., adding Mrs. or Ms. prior to Alice in the above example, and the like. Forward hashing therefore allows identification of hashed IV records and data in a database without knowing the underlying data by converting possible word, text, or character strings into different hashes. These different hashes may then be used to match to stored hashes. Thus, with forward hashing, a search query may be entered, and different iterations or variations of the search query may be generated. This forward hashing may occur on the client or participant side so that the search keys, terms, and query does not leave the client/participant device side without hashing. A search result may include both the hashed IV data and the metadata, where the metadata may provide a link or option to purchase the unhashed or regular IV data from the bureau.

For example, identity verification of a user, business, or other entity may be required as a service provider may provide electronic transaction processing to entities, such as users and third-parties that may wish to process transactions and payments between these parties. In order to establish these accounts and/or utilize transaction processing services, identity verification of one or more parties, entities, or users may be required by the service provider. The entity that the service provider requires identification and verification of may correspond to consumers, merchants, businesses, etc. The digital account and/or digital wallet information may be provided through services of the service provider, including a transaction history and other payment information associated with the payment instruments and/or digital wallet. The entity may also interact with the service provider to establish an account and other information for the user through the third-party's application.

Therefore, the entity may pay for one or more transactions using a digital wallet or other account with the online service provider or other transaction processor (e.g., PayPal®). An account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The entity may also be required to provide financial information, including payment card (e.g., credit/debit card) information, bank account information, gift card information, benefits/incentives, and/or financial investments, which may be used to process transactions after identity confirmation. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

Thus, the online service provider may provide account services to users of the online service provider, which may be used to process electronic transactions. A user wishing to establish the account may first access the online service provider and request establishment of an account. In order to pay for the transaction (e.g., a transfer or payment to another user, merchant, or other entity), the user may also be required to provide user financial or funding source information or may login to an account with the service provider through authentication information and process the transaction using the account. To avail itself of the services provided by the service provider, the service provider may require identity verification data to confirm the entity's identity and data, as well as extend services to the entity. In this regard, the service provider may provide and/or utilize an online marketplace that allows for searching of different identity verification records or data with different identity verification bureaus, bureaus, or other entities.

To first generate the online digital marketplace, a service provider that provides the necessary infrastructure, network communications, and other resources may provide an online platform for the marketplace. The marketplace platform may be constructed to be accessible through a website and/or dedicated application resident on a device, and may provide interfaces that allow for uploading, servicing, and otherwise providing data by IV bureaus, as well as searching, linking to, and/or purchasing IV data by searching entities with the IV bureaus. IV bureaus may then be onboarded with the marketplace, such as by establishing an account and/or requesting an SDK or other processing operation to upload secured IV data through a hashing algorithm and/or function. An IV bureau may then download the SDK or other available code or operations, and may implement the operations to hash and upload data to the IV bureaus systems.

Furthermore, the IV bureau may also establish an account in order to provide for payments, upload hashed IV data, and/or service that data, such as by republishing or continuously updating the hashed IV data based on changes to the underlying IV data with the IV bureau. The account may allow payments through one or more financial accounts and/or instruments, where payments may be made to the marketplace platform for use in publishing the hashed IV data and/or metadata, received from the marketplace platform when searching entities purchase the underlying IV data, and/or based on a percentage or fee that occurs when the searching entities purchase the underlying IV data with the IV bureau (e.g., based on a fee arrangement or schedule). The marketplace platform may allow for multiple IV bureaus to be onboarded so that IV data may be searched between different IV bureaus by searching entities.

Thereafter, an IV bureau may wish to upload one or more IV records or other data. For example, the IV bureau may generate, store, and maintain IV records or other data of entities, such as personal users, businesses, companies, and the like. IV data for an entity may correspond to that information necessary to perform an identity verification of the user in a manner sufficient to meet regulations, laws, or rules when that entity is performing some action, such as setting up an account or financial instrument, requesting transaction processing services, or otherwise availing themselves of the products and services of a service provider.

For example, IV data may correspond to user personal information (e.g., name, address, personal identifier, social security number, device identifier(s), financial instruments, credit rating, known acquaintances, etc.), business information (e.g., employer identification number, address, business name, employees, financial account information, etc.), or other data that may be used to verify an entities identity to reduce risk and authenticate the identity with a system. The IV bureau may generally sell this data or otherwise make available to those service providers requiring identity verification. Thus, the IV bureau may not wish to provide plain copies or records of the IV data to the service provider as the IV bureau is unable to receive remuneration for the data, including generating or updating the data, as well as control the data when the data may be invalid, old, or provided to others without permission.

In order to protect the data on the IV bureau's side, the SDK may include a hashing or other cryptographic algorithm, which may work with the IV bureau's system to hash or encrypt one or more IV records or other data. This may be done on the side of the bureau's system prior to the data being uploaded to the service provider hosting the marketplace platform. An entire record may be hashed, or only portions of the record may be hashed. For example, a name, address, employer identification number, and/or social security number may be the most common searching features when searching for IV data by a searching entity, as that may be the common data between different records and/or the data provided when performing an identity verification of an entity. Thus, one or more portions of the record may be hashed based on the basic attributes common for searches. Additionally, the attributes, features, or other data items within the record for an entity may have different ways of being represented, such as with numbers, abbreviations, and the like. Thus, the hashing algorithm may hash different variations of the same data item so that different hashes are generated.

Along with the hashed data, metadata can be added to the hashed data depending on the underlying record's data. For example, the metadata may include underlying data that is available in the record for an entity, such as all the attributes and information contained in the record (e.g., the metadata may indicate the underlying data has a name, an address, etc.). The metadata may include relationships with other users and businesses, inferred social connections with other users, family members or other associated entities available with the IV bureau or other national registries, and/or inferred or crawled data from an online scraping of the entity's data. The metadata may also include information about the record, such as a last updated date, a source of the various data and whether it is scored or verified for authenticity, a link or process to retrieve and purchase the data, and any pricing information about the record (e.g., cost of the record depending on the entity, the amount of the data retrieved from the record, etc.). Once the metadata is attached to the hashed data, the SDK may upload the hashed data and metadata to the marketplace, where the marketplace may then publish the data through a browsing and search platform for viewing, purchase, and/or retrieval by entities requesting identity verification of another entity.

The marketplace platform may include one or more processes to generate data catalogs of the data available from the different IV bureaus based on the hashed data and the metadata. Data catalogs may correspond to IV data grouped by IV bureau, metadata, or characteristic of the underlying data (e.g., verification score, source of IV data, information in the IV data, location, user/business category, etc.). In other embodiments, the marketplace platform may provide one data catalog that corresponds to all hashed IV data without aggregating by a topic or parameter. Since the underlying IV data within the data catalogs is hashed, it is not shared with the service provider for the marketplace or other entities searching for the IV data. Further, when generating the data catalogs, the marketplace may further assimilate and/or aggregate the data from the different bureaus into a set for a particular entity (e.g., a user or business that has IV data used by searching entities for identity verification). The aggregation may be done using the hashes of the basic attributes, as well as the metadata for the uploaded hashed data. Knowledge graphs may be generated for the entities, including hashes of uniquely deterministic data (e.g., a social security number, tax identifier, business registration number, employer identification number, etc.) under certain nodes and nondeterministic data (e.g., name, address, date of birth, etc.) may be group under a node under the root node for each set. The metadata may also be grouped under various nodes based on the metadata items, such as by type and information.

Once the catalogs of data are constructed, the marketplace platform may allow different searching entities (including the service provider offering the marketplace platform for IV data searching) to search the catalogs of data and other aggregated information of IV data of relevance to the searching entity. However, since the underlying data is hashed when stored by the marketplace platform, using plain text, SQL, or natural language search operations would not return results (e.g., as hashed data is undecipherable for the underlying data). Thus, the marketplace platform may institute a search engine that utilizes a forward hashing algorithm and function to generate different hashes based on the search features. The search request may include different parts, including the basic attributes in plain text of an entity that the search requester enters, the attributes that the search requester requires (e.g., credit history, verified address, business owners, etc.), and any match making directives (e.g., a last updated maximum date, a price point, a preferred source, a record rating or score for validity, etc.). In order to perform match-making and searching of the hashed records, the marketplace platform's search engine may provide, to client device, processes to hash the basic attributes in different variations or iterations, such as by hashing the basic attributes is different orders or based on different forms or formatting of the language of the basic attributes. For example, hashes may be generated differently for a first and last name order, a business (e.g., using Corporation vs. Corp.), a street address, or the like. Thus, the forward hashing may generate multiple different search queries for data that correspond to different hashes of the search query and the underlying data. This may be used to match to the deterministic and non-deterministic hashes to generate an overall match score and provide search results based on the score.

When providing search results, the search results may show the matches, the scoring for the matches, and any information about the hashed IV data. Since the IV data is still hashed, showing the hashed IV data may not be of use to the searching entity in the search results. Thus, the search results may further include the metadata describing the underlying IV data from the bureau. Further the search results may include one or more links to the underlying IV data with the bureau and/or to the bureau directly, so that the IV data may be purchased in unhashed or clear form. The search result(s) may also include one or more purchase options to directly purchase the IV data with the IV bureau through the service provider's marketplace. Moreover, the IV bureaus may update the underlying IV data, where the SDK residing on the bureau's systems may rehash the IV data and continuously or periodically upload and republish the new hashed IV data on the marketplace platform. In some embodiments, in order to make the IV data more robust and in-depth, the marketplace platform may also retrieve IV data from different user devices, which may be added to any known records for the service provider.

In some embodiments, the marketplace platform may also require user consent to release IV data to various searching entities. For example, a user may be notified via the marketplace if their information is searched and requested from an IV bureau, where the user may be required to consent to release of the IV data. In other embodiments, the user may preset their consent or withdraw their consent so that their IV data is not released. In this manner, IV data may remain secure with a digital marketplace but still allow for multiple different bureaus to be linked and searched in a convenient platform. Further, by hashing the data, security for the IV data may be increased when stored by multiple different platforms. In order to resolve the potential searching issues, a forward hashing function may generate different hashes so that hash matching may be obtained without risking the release of the underlying data.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity System 100 includes a client device 110, an end user device 120, a service provider server 130, and identity data bureaus 150 in communication over a network 160. Client device 110 may be utilized by a user, business, or entity to access a search engine to locate IV data with service provider server 120 and perform and identity verification of a user based on IV data generated and updated by identity data bureaus 150. In this regard, identity data bureaus 150 may hash and upload the IV data to service provider server 130 based on an SDK provided by service provider server 130.

Client device 110, end user device 120, service provider server 130, and identity data bureaus 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Client device 110 may be implemented as a communication device that may utilize appropriate hardware and software configured for wired and/or wireless communication with service provider server 130. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Client device 110 may instead correspond to a client server, such as a server or servers of a merchant or entity that is performing identity verification of consumers, other merchants, and affiliates (e.g., for use of a service or purchase of a product). Although only one device is shown, a plurality of devices may function similarly and/or be connected to provide the functionalities described herein.

Client device 110 of FIG. 1 contains a search application 112, a database 116, and a network interface component 118. Search application 112 may access data stored by database 116 for performing operations and interactions with service provider server 130, such as by providing account, device, or user identifiers, submitting search queries, and/or providing search results. Such interactions by search application 112 with service provider server 130 may be performed via network communications sent and received using network interface component 118. In other embodiments, client device 110 may include additional or different modules having specialized hardware and/or software as required.

Search application 112 may correspond to one or more processes to execute software modules and associated components of client device 110 to provide search features, services, and other operations for identity verification (IV) data from service provider server 130. In this regard, search application 112 may correspond to specialized hardware and/or software utilized by a user of client device 110 that may be used to access a website or an UI provided by service provider server 130 that allows users to search for and locate IV data with a marketplace of IV hosted by service provider server 130. Search application 112 may utilize one or more UIs, such as graphical user interfaces presented using an output display device of client device 110, to enable the user associated with client device 110 to enter and/or view search data including providing search queries having search terms and viewing search results. In some embodiments, the UIs may allow linking to one or more websites or resources with identity data bureaus to allow for purchase of IV data based on hashed IV data located on the marketplace and any identifying metadata. Furthermore, in order to provide for searching of data, client device 110 may include forward hashing operations 114 that may allow for forward hashing of different terms and/or attributes in a search query into different hashed search queries based on different iterations or sequences of words, phrases, or other terms. This may utilize the same hashing algorithm of SDK 135 to allow for matching of hashed IV data attributes to search terms.

In some embodiments, search application 112 may include services for electronic transaction processing provided by service provider server 130, which may be utilized to purchase IV data. During transaction processing, search application 112 may be utilized to select payment instrument(s) for use in providing payment for a purchase transaction, transfer, or other financial process. As discussed herein, search application 112 may utilize user financial information, such as credit card data, bank account data, or other funding source data, as a payment instrument when providing payment information. Additionally, search application 112 may utilize a digital wallet associated with an account with a payment provider, such as service provider server 130, as the payment instrument, for example, through accessing a digital wallet or account of a user with service provider server 130 through entry of authentication credentials and/or by providing a data token that allows for processing using the account. Search application 112 may also be used to receive a receipt or other information based on transaction processing, including transaction data 122 in display 120.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with search application 112 and/or other applications 112, identifiers associated with hardware of client device 110, or other appropriate identifiers, such as identifiers used for payment/user/device authentication or identification, which may be communicated as identifying the user/client device 110 to service provider server 130. Moreover, database 116 may include any search queries and requests having search terms, as well as search results to the search queries.

Client device 110 includes at least one network interface component 118 adapted to communicate with service provider server 130. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

End user device 120 may be implemented as a communication device that may utilize appropriate hardware and software configured for wired and/or wireless communication with service provider server 130 or another device or server for accrual of IV data by service provider server 130. For example, in one embodiment, end user device 120 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

End user device 120 of FIG. 1 contains identity collection operations 122. Identity collection operations may correspond to executable processes, procedures, and/or applications with associated hardware. In other embodiments, end user device 120 may include additional or different modules having specialized hardware and/or software as required. Identity collection operations 122 may correspond to operations used by end user device 130 and/or service provider server 130 to collect additional IV data for a user, such as information entered to an application (e.g., a name, address, financial instrument, etc.), information tracked of a user (e.g., geo-locations, communications, used IP addresses, device identifiers), and/or associated with other devices, users, or entities (e.g., check-ins and locations or businesses, co-locations, social networking connections, etc.). In this regard, the additional data may be provided to service provider server 130 to be accrued with and/or update hashed or unhashed IV data that service provider server 130 obtains, has stored, or aggregates for one or more entities, users, or businesses.

Service provider server 130 may be maintained, for example, by an online service provider, which may provide a marketplace to browse and/or search for IV data in a hashed format, which may allow users to purchase unhashed IV data from a corresponding one of identity data bureaus 150. In this regard, service provider server 130 includes one or more processing applications which may be configured to interact with client device 110 to provide the marketplace and a search operation on client device 110. In one example, service provider server 130 may be provided by PAYPAL®, Inc. of San Jose, Calif., USA. However, in other embodiments, service provider server 130 may be maintained by or include another type of service provider.

Service provider server 130 of FIG. 1 includes an identity marketplace application 140, a transaction processing application 132, a database 134, and a network interface component 138. Identity marketplace application 140 and transaction processing application 132 may provide a marketplace platform for IV data and processes to purchase IV data for client device 110 and identity data bureaus 150. Communications to provide the marketplace platform to client device 110 and/or service provider server 130 may be facilitated via network communications sent and received using network interface component 138. In other embodiments, service provider server 130 may include additional or different modules having specialized hardware and/or software as required.

Identity marketplace application 140 may correspond to one or more processes to execute modules and associated specialized hardware of service provider server 130 to provide a marketplace platform that allows searching entities, such as users, businesses, etc., to perform an identity verification of another entity as required by laws, rules, or regulations requiring verification of an entities identity so as to provide products or services to that entity. In this regard, identity marketplace application 140 may correspond to specialized hardware and/or software used by service provider server 130 to onboard one or more of identity data bureaus 150, which may include establishing an account or identifier for the data bureau(s) or bureaus and providing identity data bureaus 150 with SDK 135 for use in hashing IV data and uploading the hashed IV data to service provider server 130. Thereafter, the hashed IV data may be aggregated according to the hashed attributes and/or metadata and made available for searching entities to browse or search through a marketplace platform.

Forward hashing operations 114 may enter the hashed search queries to search operations 142, where search operations 142 may return one or more results based on match scores and ratings. Identity marketplace application 140 may return the search results to client device 110, where a user may browse the search results to select and requested the underlying unhashed IV data from one or more of identity data bureaus 140. Identity data marketplace application 140 may link to one or more of identity data bureaus 140 to purchasing of the IV data in unhashed or clear form or may facilitate a purchase. In some embodiments, service provider server 130 may receive the unhashed data during the purchase and may store for additional use and/or updating, such as based on additional IV data received from end user device 120. In some embodiments, identity marketplace application 140 may also be used to allow for users to opt-in to allowing their IV data to be accessed and/or viewed by other searching entities, which may establish an opt-in or opt-out prior to another party obtaining the IV data and/or allow for notifications and requests to distribute the IV data when a search result and IV data request is received through the marketplace platform provided by identity marketplace application 140.

Transaction processing application 132 may correspond to one or more processes to execute modules and associated specialized hardware of service provider server 130 to process a transaction, which may be done through the marketplace platform for IV data provided by identity marketplace application 140. In this regard, transaction processing application 132 may correspond to specialized hardware and/or software used by an entity associated with client device 110 to establish a payment account and/or digital wallet, which may be used to process transactions. In various embodiments, financial information may be stored to the account, such as account/card numbers and information. A digital token for the account/wallet may be used to send and process payments, for example, through an interface provided by service provider server 130. In some embodiments, the financial information may also be used to establish a payment account. The payment account may be accessed and/or used through a browser application and/or dedicated payment application executed by client device 110 and engage in transaction processing through transaction processing application 132. Transaction processing application 132 may process the payment and may provide a transaction history to client device 110 for transaction authorization, approval, or denial.

Additionally, service provider server 130 includes database 134. Database 134 may store various identifiers associated with client device 110. Database 134 may also store account data, including payment instruments and authentication credentials, as well as transaction processing histories and data for processed transactions. Database 134 may store financial information and tokenization data. Database 134 may further store data necessary for identity data bureaus 150 to upload data, such as SDK 1356 that may be provided to the bureaus for hashing and uploading data. Further, database 134 may store hashed identity data 136 that is provided through identity marketplace application 140 to searching entities.

In various embodiments, service provider server 130 includes at least one network interface component 138 adapted to communicate client device 110, end user device 120, and/or identity data bureaus 150 over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Identity data bureaus 150 may be maintained, for example, by IV data bureaus that may sell or otherwise provide records and other data used for identity verification by service providers that require the identity verification of one or more other entities in order to provide products or services to the other entities. In this regard, identity data bureaus 150 includes one or more processing applications which may be configured to interact with client device 110 and/or service provider server 130 to IV data, which may include hashed IV data based on an SDK that includes a hashing algorithm. In one example, identity data bureaus 150 may be provided by PAYPAL®, Inc. of San Jose, Calif., USA. However, in other embodiments, identity data bureaus 150 may be maintained by or include another type of service provider.

Identity data bureaus 150 of FIG. 1 each include an identity data application 152, a database 154, and a network interface component 156. Identity data application 152 may provide IV data stored by database 116 to service provider server 130, for example, using an SDK provided by service provider server 130 that hashes IV data prior to transmission to service provider server 130. Communications to provide plain and/or hashed IV data to client device 110 and/or service provider server 130 may be facilitated via network communications sent and received using network interface component 1561n other embodiments, identity data bureaus 150 may include additional or different modules having specialized hardware and/or software as required.

Identity data application 152 may correspond to one or more processes to execute modules and associated specialized hardware of identity data bureaus 150 to provide IV data to users, which may include processes to provide an online platform that allows users to purchase IV data. In this regard, identity data application 152 may correspond to specialized hardware and/or software used by identity data bureaus 150 to establish an account and/or receive SDK 135 from service provider server 130, where SDK 134 may then be implemented in identity data application 152 so that identity data 155 from database 154 may be hashed and uploaded to service provider server 130. This may be done through all records or data in identity data 155 or may correspond to a subset of that data identified for uploading. Moreover, as identity data application 152 updates identity data 155, SDK 135 may be used to continuously or periodically rehash, update, and/or upload the new data to service provider server 130.

Additionally, identity data bureaus 150 includes database 154. Database 154 may store various identifiers associated with client device 110. Database 154 may also store account data, including payment instruments and authentication credentials, as well as transaction processing histories and data for processed transactions. Database 154 may store financial information and tokenization data. Database 154 may further store identity data 155 that may be used for identity verification through service provider server 130.

In various embodiments, identity data bureaus 150 includes at least one network interface component 156 adapted to communicate client device 110, end user device 120, and/or service provider server 130 over network 160. In various embodiments, network interface component 156 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
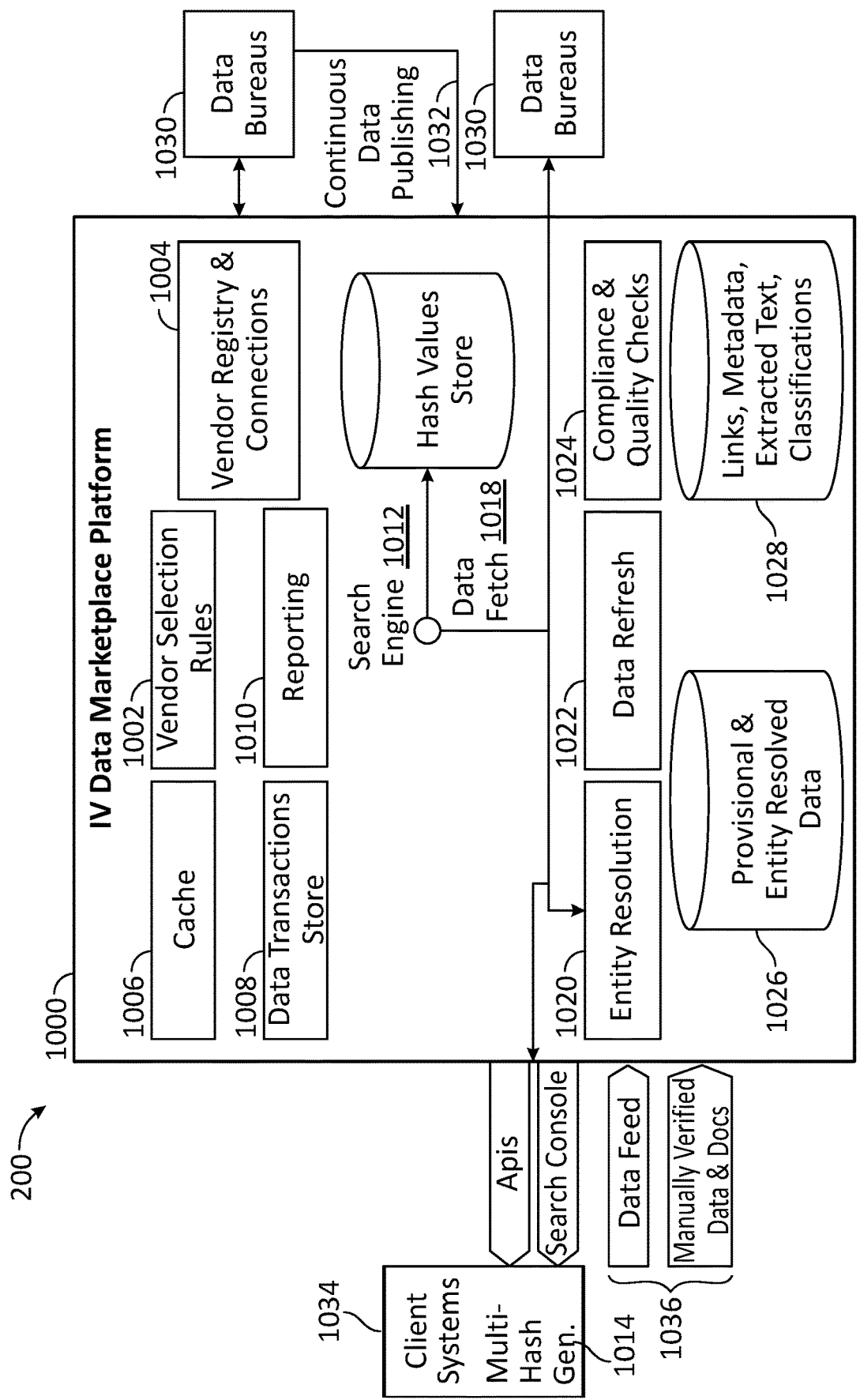
FIG. 2 is an exemplary system environment where a gateway may interact with a database storing identity verification data for providing hashed data on a marketplace, according to an embodiment.

FIG. 2 is an exemplary system 200 where a gateway may interact with a database storing identity verification data for providing hashed data on a marketplace, according to an embodiment. System 200 in FIG. 2 shows an exemplary infrastructure of a system of a service provider that provides a marketplace platform to allow for searching of IV data in a hashed format. In this regard, one or more client devices may access the marketplace platform shown in system 200 in order to search data provided to the platform by one or more bureaus, data bureaus, or other IV service providers.

IV data marketplace 1000 is shown with various components enabling interactions with data bureaus 1030 and client systems 1034 to facilitate providing IV data searchable in a hashed format to entities requiring identity verification of other entities. IV data marketplace 1000 includes bureau selection rules 1002 that allow for selection of bureaus, such as those rules regarding trusted bureaus, required bureau credentials or scoring, bureau payment and fee structures and agreements, and the like. Other bureau selection rules 1002 may be associated with client criteria for particular bureaus. Using bureau selection rules 1002, bureau registry and connections 1004 may be established with data bureaus 1030, which include data necessary to establish connections, provide an SDK to data bureaus 1030, and perform continuous data publishing 1032 for IV data in a hashed format from data bureaus 1030 using the SDK. Continuous data publishing 1032 may provide hashed IV data to IV data marketplace 1000 from data bureaus 1030 after data bureaus 1030 hash the data using the SDK. This includes hashing portions or all of the data so that the underlying data is searchable but not revealed and stored by IV data marketplace 1000.

Further, in order to provide more robust IV data, input 1038 may include data feeds and/or manually verified data and documents from entities, which may be added to hashed or unhashed IV data available with IV data marketplace 1000. Cache 1006 may provide a cache for hashed IV data, search queries including forward hashed search terms of the query, and search results for IV data marketplace 1000. Data transactions store 1008 may correspond to a transaction store allowing for purchase of IV data and/or linking to IV data in an unhashed format, which may allow for payment and transaction processing for IV data from data bureaus 1030 in a search result provided by IV data marketplace 1000 to client systems 1034. Reporting 1010 may generate reports on the data transactions performed on IV data marketplace 1000. For example, the data transactions may include volume and type of data shared with different entities, search efficiency, system performance, and/or client activity, which may be used for monitoring and invoicing (e.g., by a system admin, billing admin, etc.)

In order to provide for searching of hashed IV data with IV data marketplace 1000, a search engine 1012 may be accessible to client systems 1034. Client systems 1034 may utilize the APIs of IV data marketplace 1000 to access a search console that allows for entry of a search query. The search query may be provided to search engine 1012 for processing, where a multi-hash generation 1014 on client systems 1034 may be performed using a forward hashing operation. Multi-hash generation 1014 may correspond to a forward hashing operation that generates multiple different hashes of the search query by rearranging and varying the search terms and components of the search terms, including different versions of certain words or phrases. Multi-hash generation 1014 utilizing the forward hashing operation therefore generates multiple different search queries that correspond to different hashes. The search terms that have been forward hashed may be processed using hash values store 1016 for determination of a search result based on the hashed search terms arranged in different orders and combinations. This may result in matching hashed data based on similarities between hashed terms and hashed IV data, which may be provided back to client systems 1034. Further, provisioned and entity resolved data 1026 provide an option where IV data marketplace 1000 may receive data and send out to the requesting client of client system 1034. Thus, all incoming data can be entity resolved and organized in IV data marketplace 1000 so as to avoid duplicate data and maximize available attributes. Links, metadata, extracted text, and classifications 1028 may be used to further bolster search results, as well as provide additional data with the search results. For example, links, metadata, extracted text, and classifications 1028 may be provided to enrich data using available online data, such as a social networking feed, image sharing platform feed or profile, website data, risk scores, optical character recognition extracted data, identity documents and data describing such documents, and the like.

Thereafter, a data fetch 1018 may be performed from search results based on hash values store 1016 and the forward hashed search query from multi-hash generation 1014. This may occur when one of client systems 1034 requests data from one or more of data bureaus 1030 based on the search results. For example, an entity receiving search results may view a particular hashed data record that includes matching hashed data, relevant metadata, and/or complying with match-making restrictions and requirements. Thereafter, the entity may select a link and/or request a purchase of the underlying IV data so that the entity can perform an identity verification. Data fetch 1018 may utilize entity resolution 1020 to determine one or more of data bureaus 1030 and route the entity to the proper process to purchase the underlying IV data. Further, IV data marketplace 1000 may include additional operations for a data refresh 1022 and compliance and quality checks 1024 to maintain the integrity of the hashed and/or plain IV data. For example, data refresh 1022 may be used to determine if any IV data has been updated or does not comply with data integrity rules (e.g., age, authenticity score, etc.). Compliance and quality checks 1024 may similarly be used to ensure that data complies with all rules, regulations, and/or laws covering the IV data and IV processes. Further, a data feed and manually verified documents may be used to add to, refresh, or validate any IV data held by IV data marketplace, for example, through data and documents available from or provided by any users.

Figure 3:
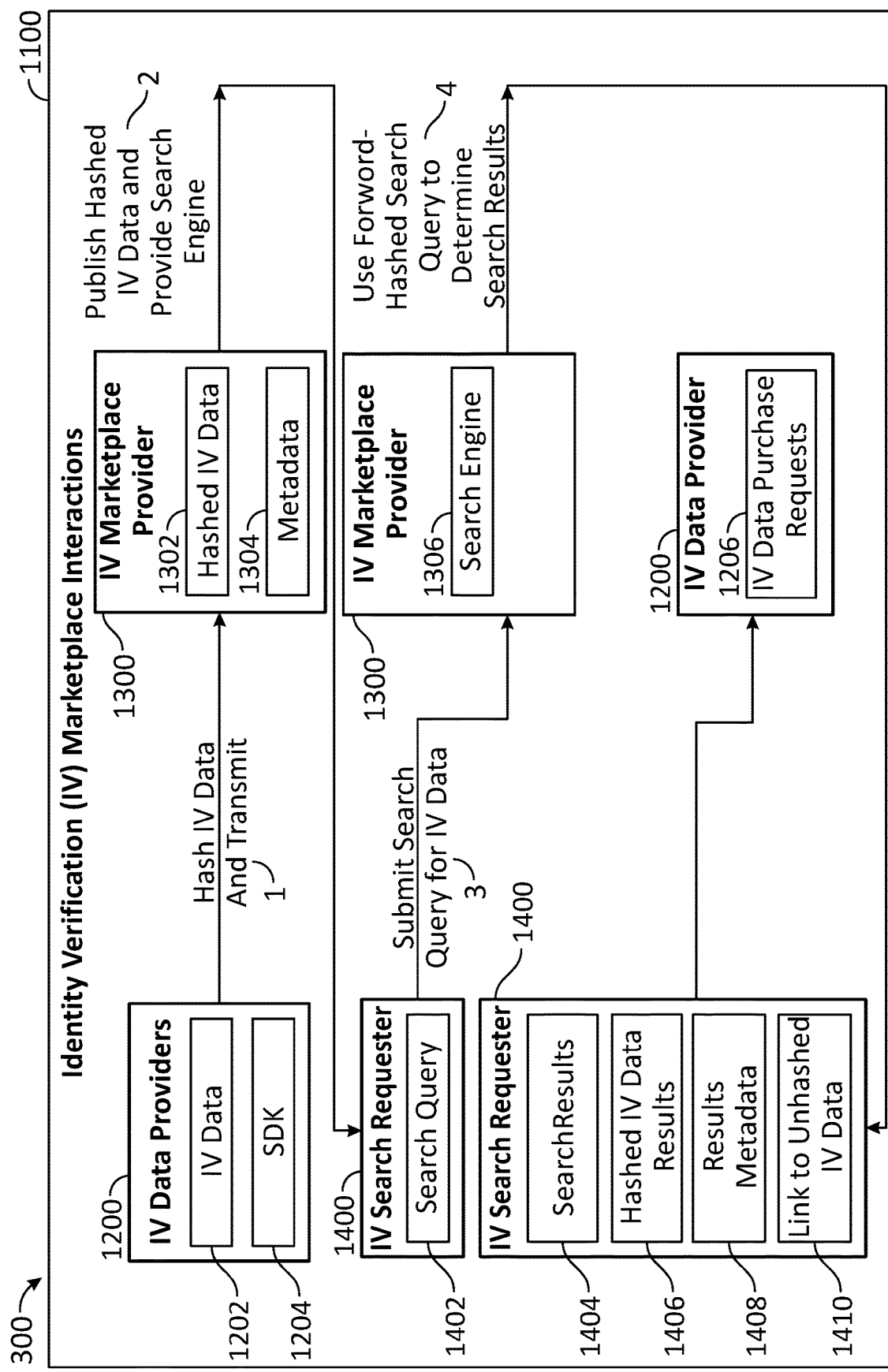
FIG. 3 is an exemplary flowchart of interactions between identity verification data providers, a marketplace, and an entity requesting identity verification through the marketplace, according to an embodiment.

FIG. 3 is an exemplary flowchart 300 of interactions between identity verification data providers, a marketplace, and an entity requesting identity verification through the marketplace, according to an embodiment. In this regard, an environment shown with flowchart 300 shows different entities interacting to provide IV data to users through a marketplace, where the marketplace is not exposed to the IV data in plain text or clear form so as to prevent compromising the IV data. Instead, the marketplace uses hashed versions of data attributes, elements, or items in the underlying data so that the data may be searched for using forward hashing while maintaining the privacy and security of the data.

For example, in IV marketplace interactions 1100, IV data providers 1200 may correspond to bureaus, data bureaus, and the like that provide IV data to other entities seeking to confirm or validate an identity or information associated with an identity of some other entity. In this regard, IV data providers 1200 include IV data 1202 that correspond to data necessary to validate the identity, whether the data includes characteristics describing or identity the entity (e.g., name, address, identifier, etc.) or other information associated with the entity that is used for various purposes (e.g., credit score, available assets, past legal history, etc.). Furthermore, in order to utilize an online marketplace so that IV data 1202 may be searched from between multiple different ones of IV data providers 1200. SDK 1204 includes a hashing algorithm and other operations necessary to hash IV data 1202 prior to uploading to the marketplace for searching and retrieving by users.

Thus, at operation 1, IV data 1202 is hashed, by SDK 1204, and transmitted to IV marketplace provider 1300. IV marketplace provider 1300 may correspond to an online marketplace platform that provides data to one or more other users for identity verification, where the data corresponds to IV data 1202 in hashed form, which is provided by IV data providers 1200. IV marketplace provider 1300 therefor includes hashed IV data 1302, which is received via SDK 1204 from IV data providers 1200. Further, IV marketplace provider 1300 includes metadata 1304 that describes hashed IV data 1302 and allows more accurate searching of hashed IV data 1302. Based on hashed IV data 1302, IV marketplace provider 1300 then publishes hashed IV data 1302 and provides a search engine, at operation 2. This may be done through the marketplace and therefore allows an online platform to be accessed and searched through the search engine. In some embodiments, prior to publishing, allowing to be searched, and/or allowing IV data 1202 for a particular entity to be retrieved, a consent may be required from that entity, which may be established when the entity provides their IV data and/or signs up for an account with IV marketplace provider 1300.

An IV search requester 1400 may correspond to an entity that requires identity verification of another entity, which may include the service provider corresponding to IV marketplace provider 1300 (e.g., to establish an account or provide a product or service to the other entity) or other entities that wish to provide products or services but require identity verification to reduce risk or due to laws or regulations. Thus, IV search requester 1400 provides a search query 1402, that includes any search terms, desired attributes, and/or search criteria and match-making parameters, and submits search query 1402 for IV data 1202, at operation 3. To provide a search query, IV search requester 1400 uses a device having a forward hashing operation, where the forward hashing algorithm for the operation allows for hashing of different iterations of search terms in search query 1402 according to potential different iterations of the data items in IV data 1202. The forward hashing operation further uses the same hashing algorithm as SDK 1204 in order to allow for matching of hashed data.

IV marketplace provider 1300 thereafter uses a search engine 1306 to execute a search based on search query 1402. In order to properly execute a search, the forward-hashed search query (e.g., different hashes of the attributes and search terms from the query) is used with a search engine, where the forward hashing was previously provided by IV search requester 1400. At operation 4, the forward hashed search query is processed, and search results are obtained. These results are obtained from IV search requester 1400, which may view search results 1404 through one or more search interfaces, where search results 1404 include hashed IV data results 1406, results metadata 1408 providing further information for hashed IV data results 1406, and links to unhashed IV data 1410 with IV data providers 1200. The links allow for purchase of IV data in plain or clear format, which has not been hashed, from IV data providers 1200. In this regard, IV data providers 1200 may include one or more IV data purchase requests 1206, which may allow IV search requester 1400 to obtain the IV data underlying one or more of search results 1404.

Figure 4A:
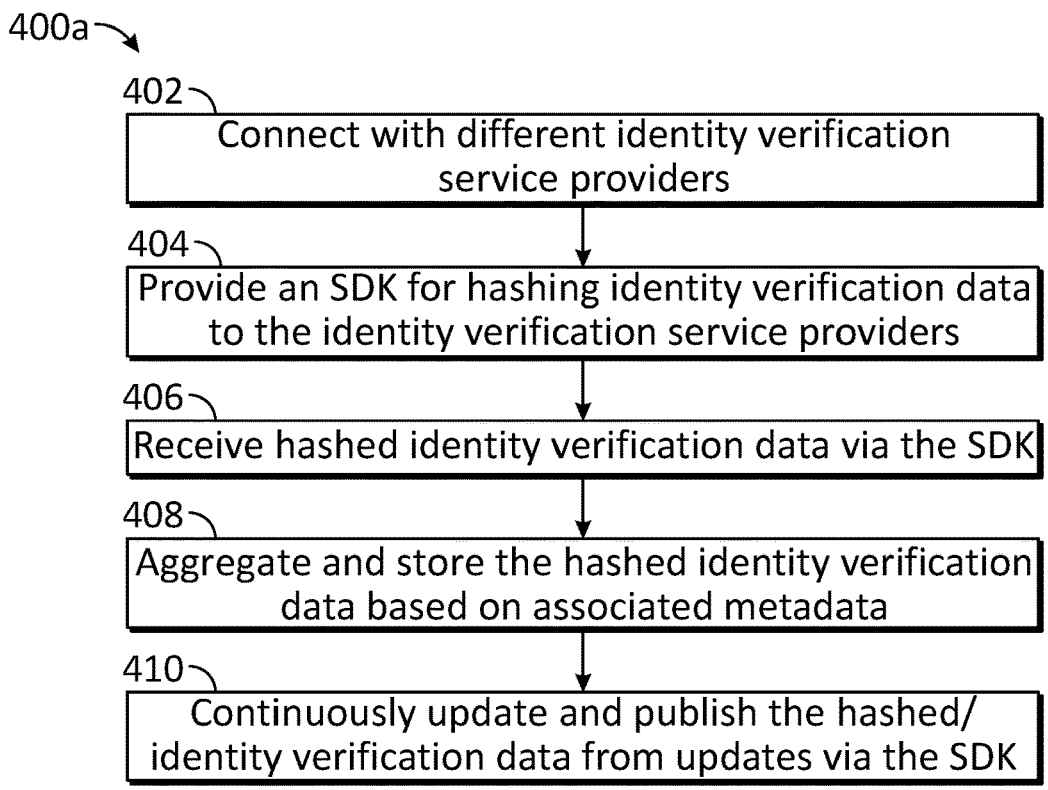
FIG. 4A is an exemplary flowchart for hashing identity verification data for a marketplace, according to an embodiment.

FIG. 4A is an exemplary flowchart 400*a* for hashing identity verification data for a marketplace, according to an embodiment. Note that one or more steps, processes, and methods described herein of flowchart 400*a* may be omitted, performed in a different sequence, or combined as desired or appropriate.

At step 402 of flowchart 400*a*, a service provider having an IV data marketplace hosted through an online platform connects with different identity verification service providers, such as different data bureaus that include identity data that verifies an identity of a user, business, or other entity. The service provider may connect with these IV service providers through the marketplace, and may establish accounts or other identifiers necessary to communicate with the IV services providers, exchange data, store data associated with the IV service providers, and connect searching entities with those IV service providers of IV data acquisition. Furthermore, after connecting with the IV service providers, the service provider hosting the IV data marketplace then provides an SDK for hashing IV data to the IV service providers, at step 404. The SDK may correspond to operations, code, a hashing algorithm, and/or other information necessary to implement the hashing algorithm in the infrastructure of the IV service providers, such as through a system that manages, updates, and provides IV data to clients and entities. The SDK may be implemented in the IV service providers' system so that the IV service providers may designate IV data for uploading to the IV data marketplace. The SDK may include operations that may be implemented in applications of the IV service providers to allow for the selection of IV data, hashing of that data using the hashing algorithm provided by the IV data marketplace, and uploading of the hashed IV data. Thus, the SDK prevents unhashed, plain text, or otherwise clear data from being uploaded to the IV data marketplace, which would compromise the data. Further the SDK may allow for continuous or period updating of hashed IV data on the IV data marketplace based on changes to the IV data with the IV service providers.

Thereafter, at step 406, the service provider hosting the IV data marketplace receives hashed IV data via the SDK. The hashed IV data may correspond to all or a subset of data from IV records or other data structures for particular users or businesses. For example, a IV record for a particular user may include five different data elements or items, such as a name, address, social security number, credit score, and financial account. Some records for users or businesses may include more or less data. When uploading the IV data, the SDK and/or IV service provider may select to have the entire record's data items hashed and uploaded, or may select a subset of those elements, such as just the name and address. This may be based on most commonly searched features for a user or business. After hashing the selected data items from the IV data for a particular IV service provider, the IV service provider may further associate the hashed IV data with metadata necessary to identify, describe, link to, and/or purchase the underlying IV data that is not hashed. For example, the metadata may include descriptors of the attributes, elements, or items in the unhashed IV data, version dates and refresh or update times, any data from connections or relationships between parties, crawled data, data sources, links to data on the IV service providers (e.g., a direct link or uniform resource identifier (URI)), and/or pricing information and purchasing options.

At step 408, the service provider may then aggregate and store the hashed IV data based on associated metadata and the hashes of the underlying deterministic or non-deterministic data items. This may be done through a knowledge graph having different nodes for hashes and metadata that allows aggregating the hashed IV data and metadata between different IV service providers. This data may then be made available on the IV data marketplace, where searching users, businesses, or companies may attempt to locate IV records of interest for other users, businesses, or companies based on search queries so that they may confirm an identity of the other entity. Further, at step 410, the hashed IV data is continuously updated and published on the IV data marketplace from updates to the hashed IV data via the SDK residing on the IV service provider's systems. This may include renewing or refreshing the data or updating specific metadata and/or hashed data items based on changes and updates to the underlying IV data in plain form with the IV service providers.

Figure 4B:
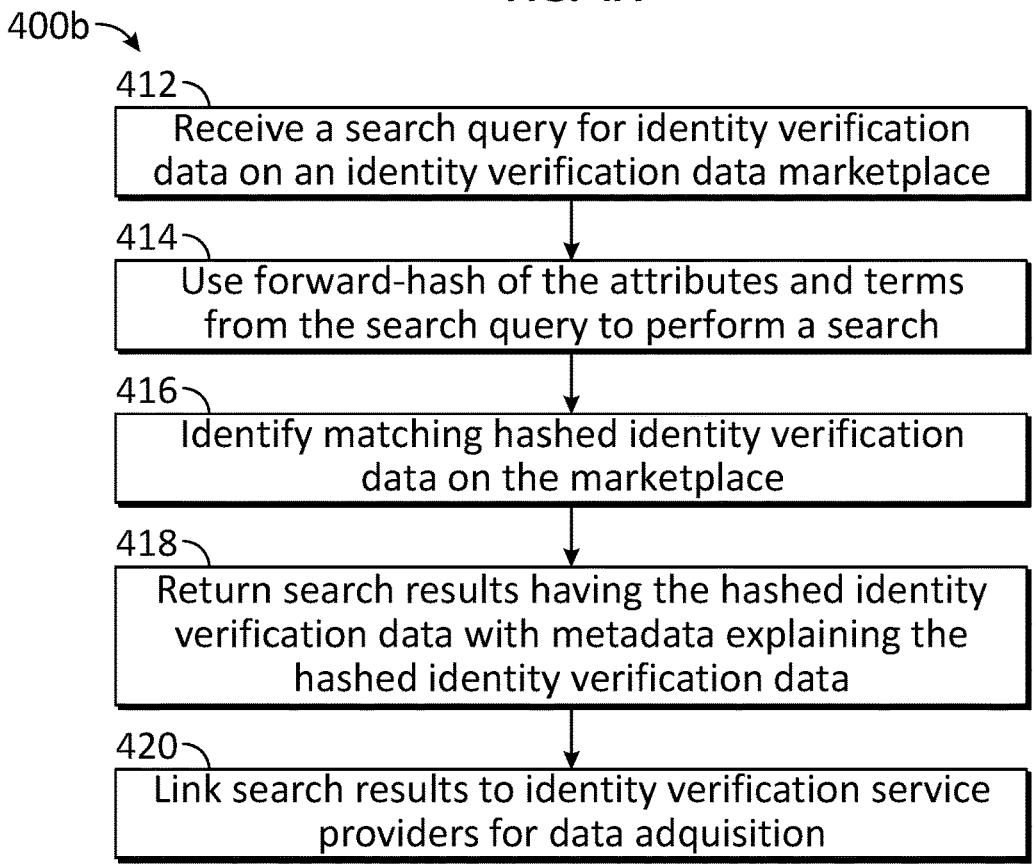
FIG. 4B is an exemplary flowchart for providing hashed identity verification data, according to an embodiment.

FIG. 4B is an exemplary flowchart 400b for providing hashed identity verification data, according to an embodiment. Note that one or more steps, processes, and methods described herein of flowchart 400b may be omitted, performed in a different sequence, or combined as desired or appropriate.

At step 412 of flowchart 400b, a search query for IV data on an IV data marketplace is received. This may be done through an interface provided via a website or search application and a corresponding search engine. The search query may include one or more search terms or attributes, which correspond to portions of the IV data that the search requester is looking for in the IV data. For example, the search requester may enter a name or address of a user when the search requester is attempting to obtain a credit score or other IV data that may be of relevance to the identity verification processes and requirements of the requester. Moreover, the search query may further include identification of other traits that the search requester desires from the IV data, such as the aforementioned credit score of importance to the search requested when performing the identity verification. In some embodiments, matching making and search directives may also be provided with the query, such as a last updated date, a lowest price or cutoff price, a preferred bureau, a preferred rating or verification source, an overall match score, partial case match preferences, or other parameters that may be unique for the search request, a setting for the client or search requester, or globally established.

Prior to receiving the search query, the desired attributes and/or entered search terms in the search query are then forward hashed by the search process on the client device. Forward hashing of the search queries attributes and/or terms may include utilizing the same hashing algorithm or process to generate different hashed search queries based on different iterations, combinations, or variations of the search terms and/or order of the search terms. For example, a name may be hashed by first name and last name, or in a reverse of last name and first name, which may generate two different hashes, each of which may be utilized for searching. Furthermore, iterations on the search terms may also be used, such as "First Street," "1$^{st}$ Street," and/or "First St." The different iterations of the search query may include the desired attributes in the underlying IV data and/or the match-making directives so that a subset of all hashed IV data may be searched after narrowing the available hashed IV data using the metadata for the hashed IV data. Thus, the search query includes different hashes of the attributes and terms in the search query, where the forward-hash of the attributes and terms are then used in a search by the IV data marketplace, at step 414.

Thereafter, at step 416, matched hashed IV data is identified on the marketplace, which may utilize scoring of the match based on matching hashed data to the hashed search terms, as well as any metadata matching. For example, the matched hashed IV data may include matching the hashed data, as well as any match-making directives and desired attributes to the metadata of the hashed IV data. At step 418, search results having the hashed IV data with the corresponding metadata explaining the hashed IV data are returned to the search requested. When returning the search results, the match score, metadata, and other information may be provided so that the search requester may view whether the hashed IV data, and therefore underlying IV data with the corresponding IV service provider, may meet the requirements of the search requester. Further, at step 420, the search results are linked to the identity service provider(s) for data acquisition. The linking may include providing a direct link, URI, or other data necessary to obtain the IV data that is not hashed by the search requester. This allows the search requester to purchase or obtain the IV data to perform their identity verification of another entity. In some embodiments, the IV data marketplace may further provide processes to purchase the IV data directly via the IV data marketplace. If purchased through the IV data marketplace, the marketplace may either securely process a transaction to purchase the data and provide to the user, or may retrieve, store, and make available the underlying IV data on the marketplace to the user. In some embodiments, prior to allowing release of the IV data through the marketplace, and/or searching and linking to the IV data for purchase with the IV service providers, a consent may be required from a user. For example, if a hit or match is found on hashed IV data and/or a purchase is requested, consent from the user (or business) may be required to release. The user may lock their IV data when providing or verifying their IV data, such as when a user accesses the service provider and establishes an account or credentials. Thereafter, the user may either opt-in or opt-out from sharing IV data with others, and/or may be notified when the IV data is being requested to consent to release of the IV data.

Figure 5:
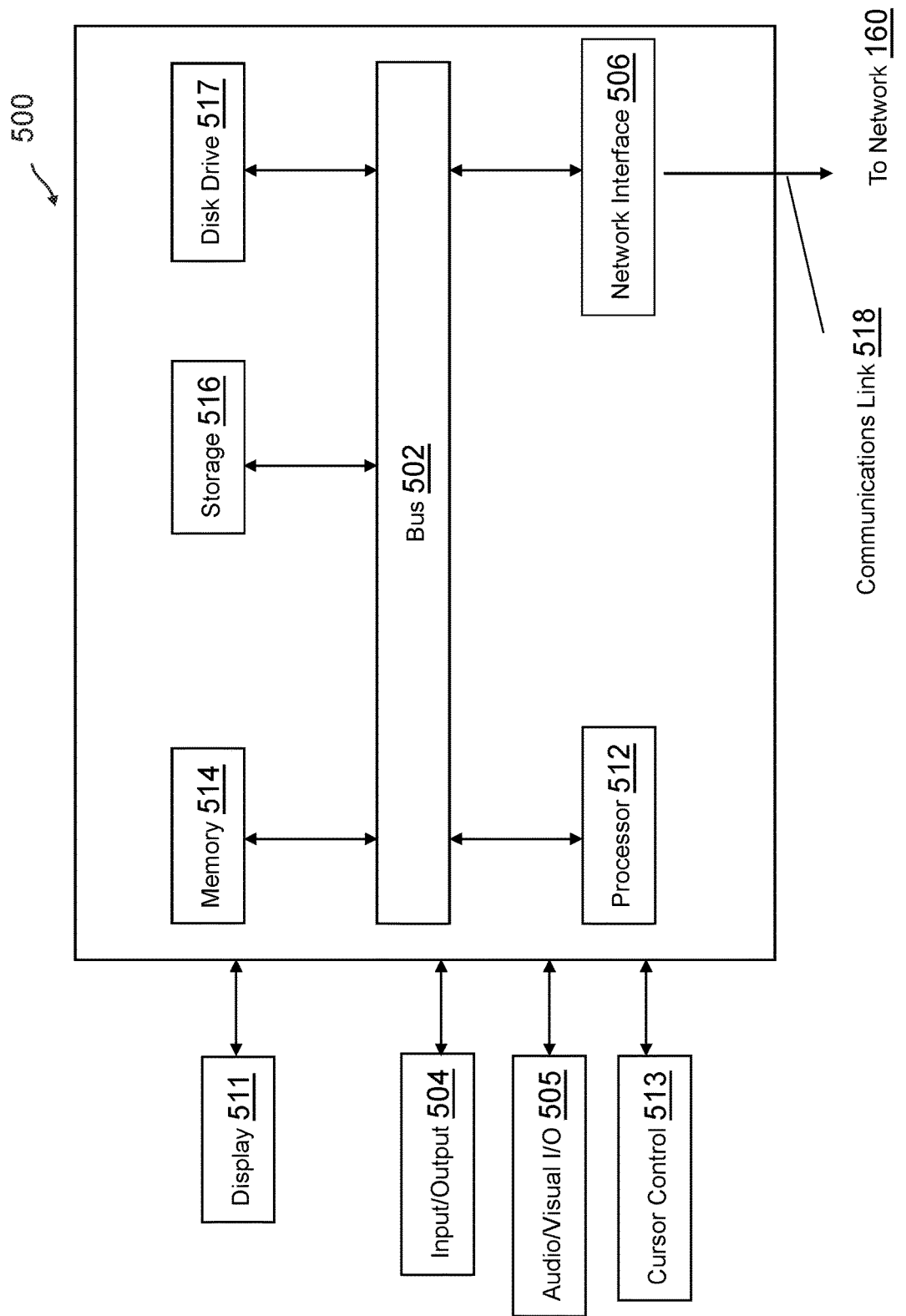
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving a search request having a first hash associated with a plurality of search attributes from a hashing operation associated with hashed identity verification records of a catalog stored by the system, wherein the hashed identity verification records are received through a plurality of identity verification entities, and wherein the search request is associated with an identity verification of an entity, wherein the search request comprises at least one second hash based on varying the plurality of search attributes in the search request prior to hashing the varied plurality of search attributes, wherein the varying comprises changing at least one of an order of the plurality of search attributes between the first hash and the at least one second hash or a text representation of the plurality of search attributes in the search request;
searching the hashed identity verification records using the first hash, wherein the searching the hashed identity verification records further uses the at least one second hash;
determining, based on the searching, an identifier of a hashed record in the hashed identity verification records, wherein the hashed record comprises first metadata corresponding to an unhashed record of the hashed record, and wherein the unhashed record is separately stored from the system by one of the plurality of identity verification entities; and
providing a search result to the search request, wherein the search result comprises at least the identifier and the first metadata.

2. The system of claim 1, wherein the plurality of search attributes comprise identity parameters for the identity verification of the entity, and wherein the plurality of search attributes further comprise match making directives for the search request.

3. The system of claim 1, wherein prior to the receiving the search request, the operations further comprise:
   receiving the hashed identity verification records from the plurality of identity verification entities; and
   generating the catalog based on the hashed identity verification records.

4. The system of claim 3, wherein prior to the receiving the hashed identity verification records, the operations further comprise:
   providing an executable process to a plurality of identity verification bureaus, wherein the executable process comprises a hashing technique for the hashed identity verification records on at least one platform separate from the system,
   wherein the hashed identity verification records are received via the executable process.

5. The system of claim 3, wherein the hashed identity verification records are received with records metadata for the hashed identity verification records, wherein the records metadata includes the first metadata, and wherein the catalog is further generated with the records metadata.

6. The system of claim 5, wherein the operations further comprise:
   in response to the generating the catalog, aggregating ones of the hashed identity verification records based on matching information in the records metadata.

7. The system of claim 1, wherein the search result comprises a link to the unhashed record with one of the plurality of identity verification entities, and wherein the link comprises a rerouting action to a purchase option with the one of the plurality of identity verification entities for the unhashed record.

8. The system of claim 1, wherein the first metadata comprises at least one of an attribute identifier for an attribute of the unhashed record, a social connection to another entity, a relationship with another entity, a related user, scraped online data, a last updated date, a source of the unhashed record, or a trust rating of the unhashed record.

9. A method comprising:
   executing, by an identity verification system, an application comprising a software development kit (SDK) for a service provider, wherein the SDK provides a hashing operation for data of the identity verification system, wherein prior to the executing, the SDK is received from the service provider, wherein the SDK is configured to operate on the data of the identity verification system prior to sending the data to the service provider, and wherein the SDK is configured to retain confidentiality of the data with the identity verification system from the service provider using the hashing operation;
   receiving an indication of an identity record for hashing from a plurality of records of the identity verification system;
   hashing, via the application, the identity record using the hashing operation;
   determining metadata for the identity record, wherein the metadata comprises at least one identifier for identity data within the identity record; and
   uploading the hashed identity record with the metadata to the service provider without revealing the identity record to the service provider.

10. The method of claim 9, further comprising:
    updating the identity record by the identity verification system;
    hashing the updated identity record;
    updating the metadata for the updated identity record; and
    updating the hashed identity record and the metadata on the service provider based on the hashing the updated identity record and the updating the metadata.

11. The method of claim 9, wherein the data comprises at least one of know-your-customer (KYC) identity records or personally identifiable information (PII) records for at least one of individuals or businesses.

12. A non-transitory machine-readable medium having stored thereon machine-readable instructions executable to cause a machine to perform operations comprising:
    receiving a search request having a first hash and at least one second hash, wherein the first hash is associated with a plurality of search attributes from a hashing operation associated with hashed identity verification records of a catalog stored by the system, wherein the at least one second hash is based on varying the plurality of search attributes in the search request prior to hashing the varied plurality of search attributes, wherein the hashed identity verification records are received through a plurality of identity verification entities, and wherein the search request is associated with an identity verification of an entity;
    providing an executable process to a plurality of identity verification bureaus, wherein the executable process comprises a hashing technique for the hashed identity verification records on at least one platform;
    searching the hashed identity verification records using the first hash and the at least one second hash, wherein the hashed identity verification records are received via the executable process;
    determining, based on the searching, an identifier of a hashed record in the hashed identity verification records, wherein the hashed record comprises first metadata corresponding to an unhashed record of the hashed record, and wherein the unhashed record is separately stored from the system by one of the plurality of identity verification entities; and
    providing a search result to the search request, wherein the search result comprises at least the identifier and the first metadata.

13. The non-transitory machine-readable medium of claim 12, wherein the varying comprises changing at least one of an order of the plurality of search attributes between the first hash and the at least one second hash or a text representation of the plurality of search attributes in the search request.

14. The non-transitory machine-readable medium of claim 12, wherein the plurality of search attributes comprise identity parameters for the identity verification of the entity, and wherein the plurality of search attributes further comprise match making directives for the search request.

15. The non-transitory machine-readable medium of claim 12, wherein prior to the receiving the search request, the operations further comprise:
    receiving the hashed identity verification records from the plurality of identity verification entities; and
    generating the catalog based on the hashed identity verification records.

16. The non-transitory machine-readable medium of claim 15, wherein the hashed identity verification records are received with records metadata for the hashed identity verification records, wherein the records metadata includes the first metadata, and wherein the catalog is further generated with the records metadata.

17. The non-transitory machine-readable medium of claim 16, wherein the operations further comprise:

in response to the generating the catalog, aggregating ones of the hashed identity verification records based on matching information in the records metadata.

18. The non-transitory machine-readable medium of claim 12, wherein the search result comprises a link to the unhashed record with one of the plurality of identity verification entities, and wherein the link comprises a rerouting action to a purchase option with the one of the plurality of identity verification entities for the unhashed record.

19. The non-transitory machine-readable medium of claim 12, wherein the first metadata comprises at least one of an attribute identifier for an attribute of the unhashed record, a social connection to another entity, a relationship with another entity, a related user, scraped online data, a last updated date, a source of the unhashed record, or a trust rating of the unhashed record.

20. The non-transitory machine-readable medium of claim 12, wherein varying the plurality of search attributes in the search request is based on different versions of one or more words or one or more phrases in the search request.

* * * * *